(No Model.) 8 Sheets—Sheet 1.
G. W. COPELAND & J. E. CRISP.
SHOE TREEING MACHINE.
No. 472,108. Patented Apr. 5, 1892.
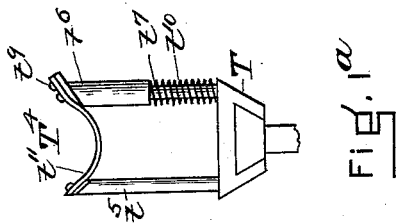
Fig. 1ᵃ
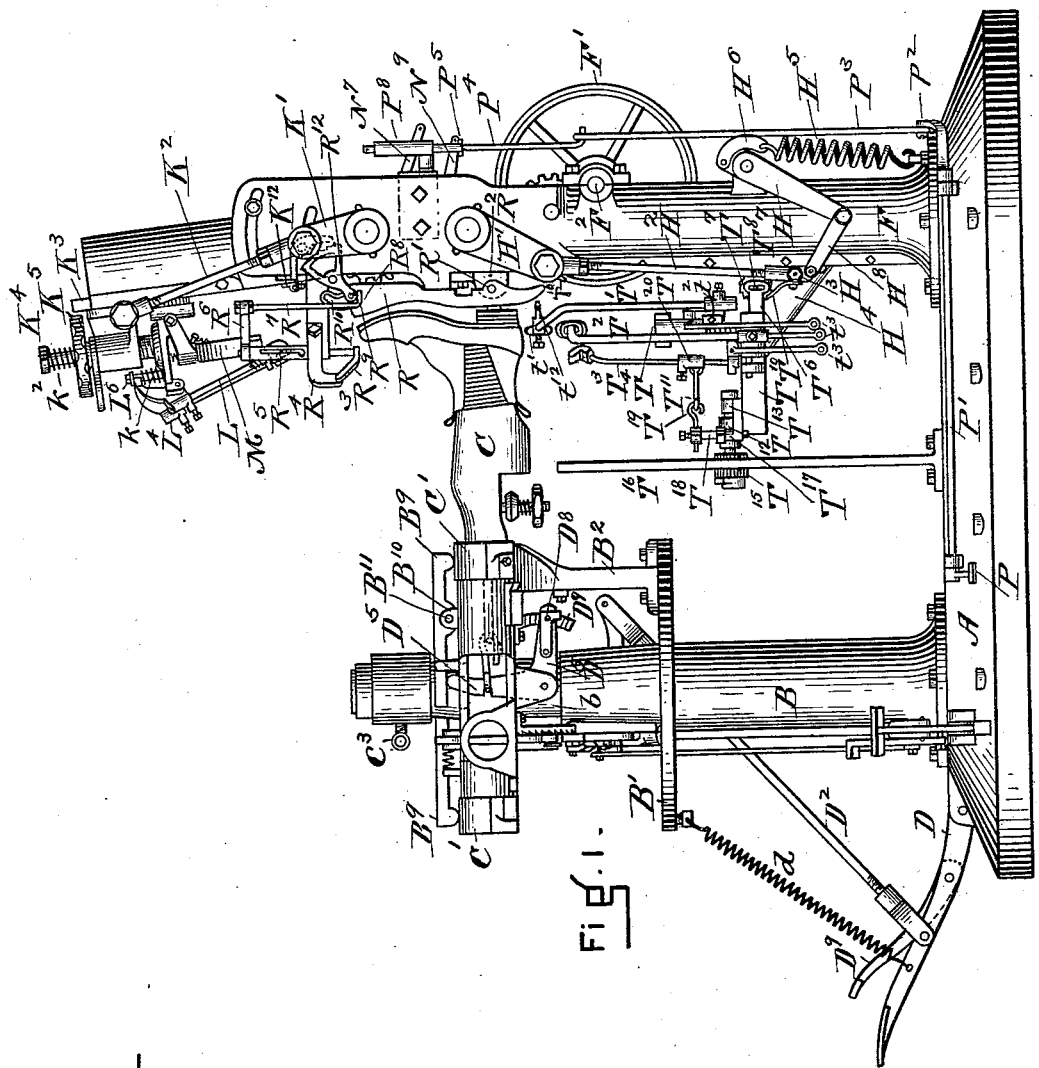
Fig. 1.
WITNESSES
G. P. Morrill.
W. A. Copeland.
INVENTORS:
George W. Copeland
Jos. E. Crisp (No Model.) 8 Sheets—Sheet 2.
G. W. COPELAND & J. E. CRISP.
SHOE TREEING MACHINE.
No. 472,108. Patented Apr. 5, 1892.
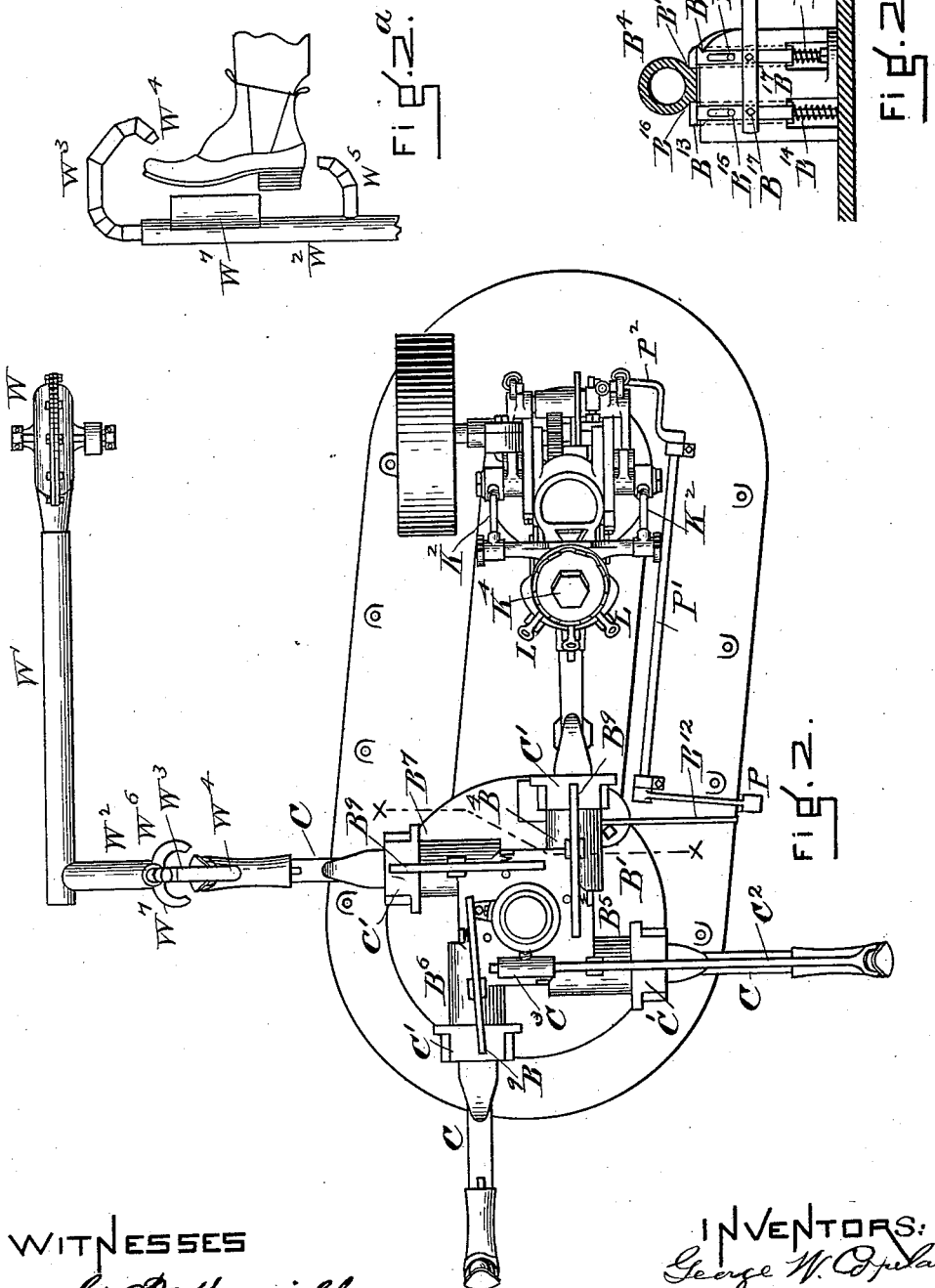

(No Model.) 8 Sheets—Sheet 3.
G. W. COPELAND & J. E. CRISP.
SHOE TREEING MACHINE.
No. 472,108. Patented Apr. 5, 1892.
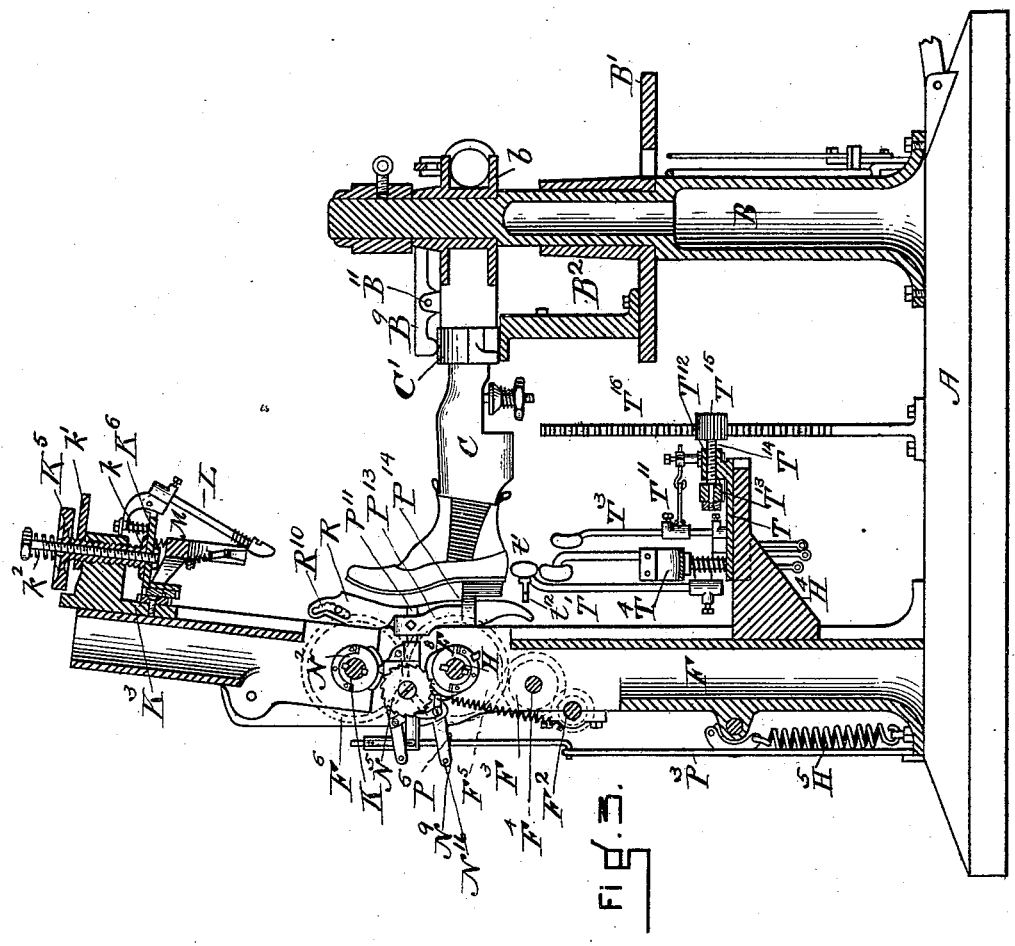
Witnesses
G. P. Morrill.
W. A. Copeland.
Inventors:
George W. Copeland,
Jos. E. Crisp (No Model.) 8 Sheets—Sheet 4.
G. W. COPELAND & J. E. CRISP.
SHOE TREEING MACHINE.
No. 472,108. Patented Apr. 5, 1892.
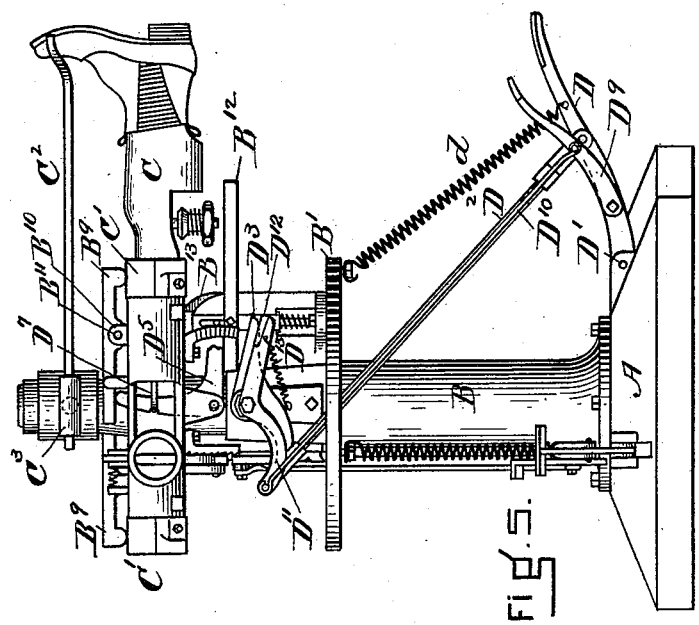
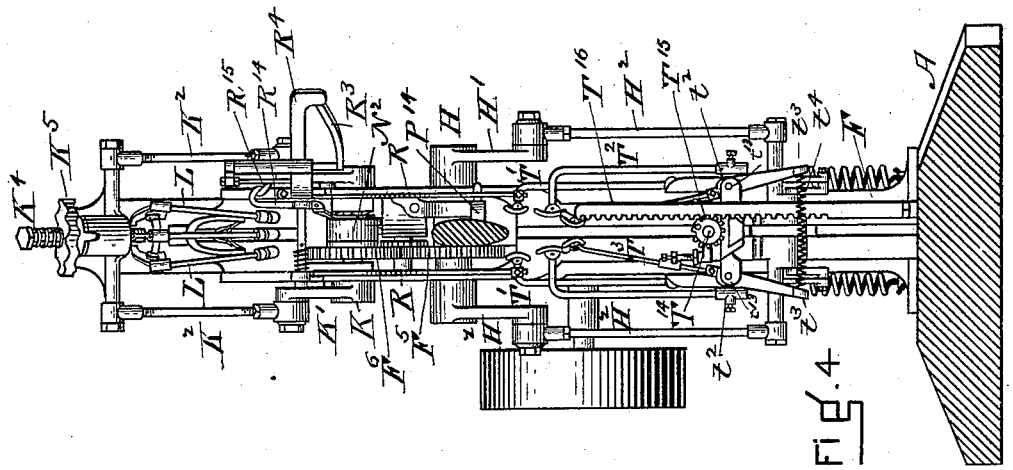
Witnesses.
G. P. Morrill.
W. H. Copeland.
Inventors:
George W. Copeland.
Jos. E. Crisp.

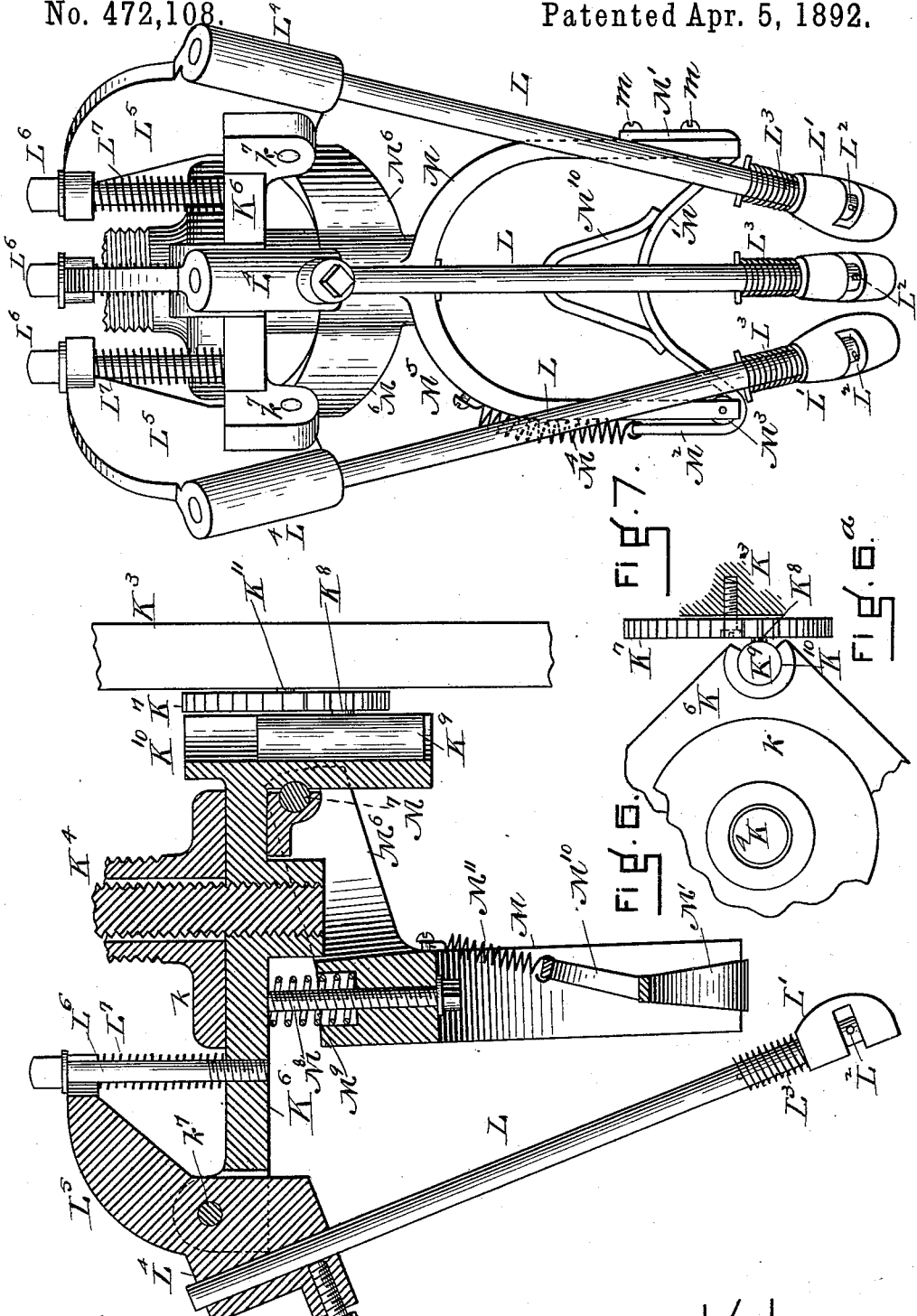

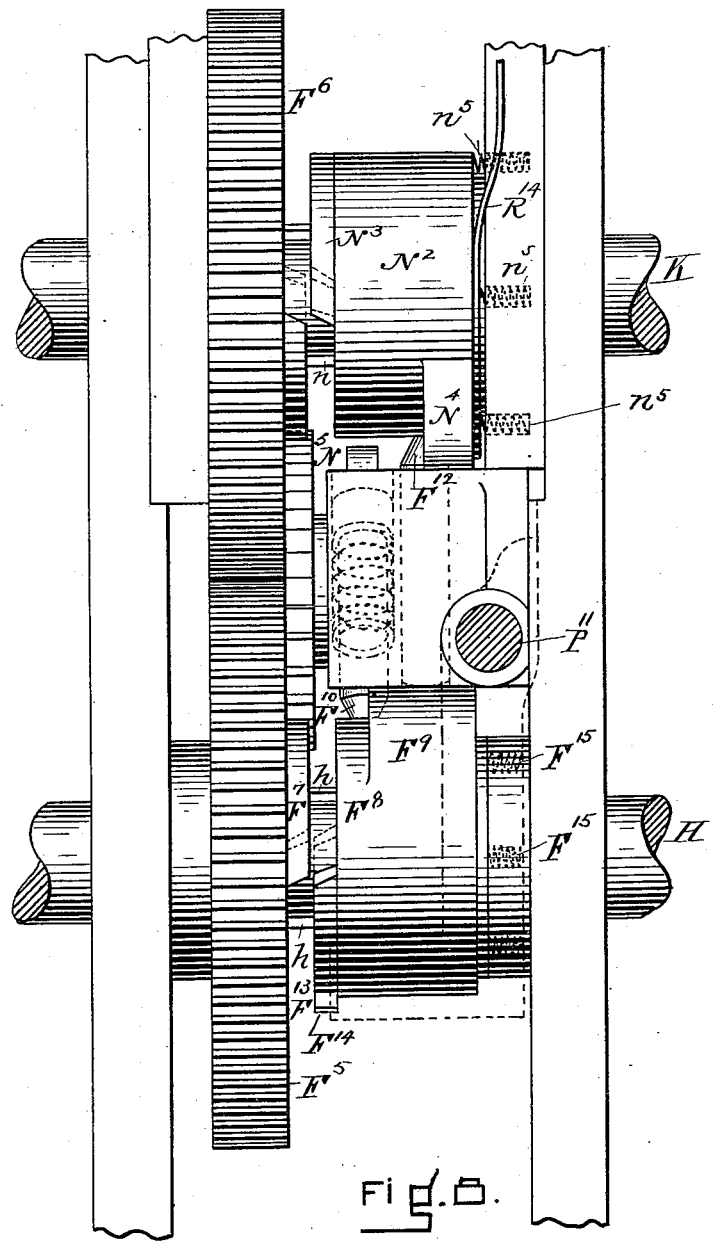

(No Model.) 8 Sheets—Sheet 7.

G. W. COPELAND & J. E. CRISP.
SHOE TREEING MACHINE.

No. 472,108. Patented Apr. 5, 1892.

WITNESSES
G. F. Morrill.
W. A. Copeland.

INVENTORS:
George W. Copeland.
Jos. E. Crisp.

(No Model.)

8 Sheets—Sheet 8.

G. W. COPELAND & J. E. CRISP.
SHOE TREEING MACHINE.

No. 472,108.

Patented Apr. 5, 1892.

UNITED STATES PATENT OFFICE.

GEORGE W. COPELAND, OF MALDEN, AND JOSEPH E. CRISP, OF SOMERVILLE, MASSACHUSETTS; SAID CRISP ASSIGNOR TO SAID COPELAND.

SHOE-TREEING MACHINE.

SPECIFICATION forming part of Letters Patent No. 472,108, dated April 5, 1892.

Application filed August 3, 1891. Serial No. 401,593. (No model.)

*To all whom it may concern:*

Be it known that we, GEORGE W. COPELAND, of Malden, and JOSEPH E. CRISP, of Somerville, both in the county of Middlesex and State of Massachusetts, and citizens of the United States, have invented new and useful Improvements in Machines for Treeing Shoes, of which the following is a full, clear, and exact description, reference being had to the accompanying drawings, forming a part of this specification, in explaining its nature.

The object of this invention is to produce a machine which automatically performs the laborious part of the treeing of shoes, combined with cold-air-blast mechanism, which enables the rubbing mechanism to be in operation the whole time.

It consists of a rotating turret carrying the required number of shoe-trees, upon which one operator places the shoes to be treed and presents them in succession, properly dressed or sized, to automatic rubbing mechanism.

It also consists of such powerful air-blast mechanism, to which the shoes are presented while the following shoe is being machine-rubbed, that the shoes at the next motion of the turret are brought to a second operator in condition for the final operation and dressing, preparatory to removing from the tree finished.

Figure 9:
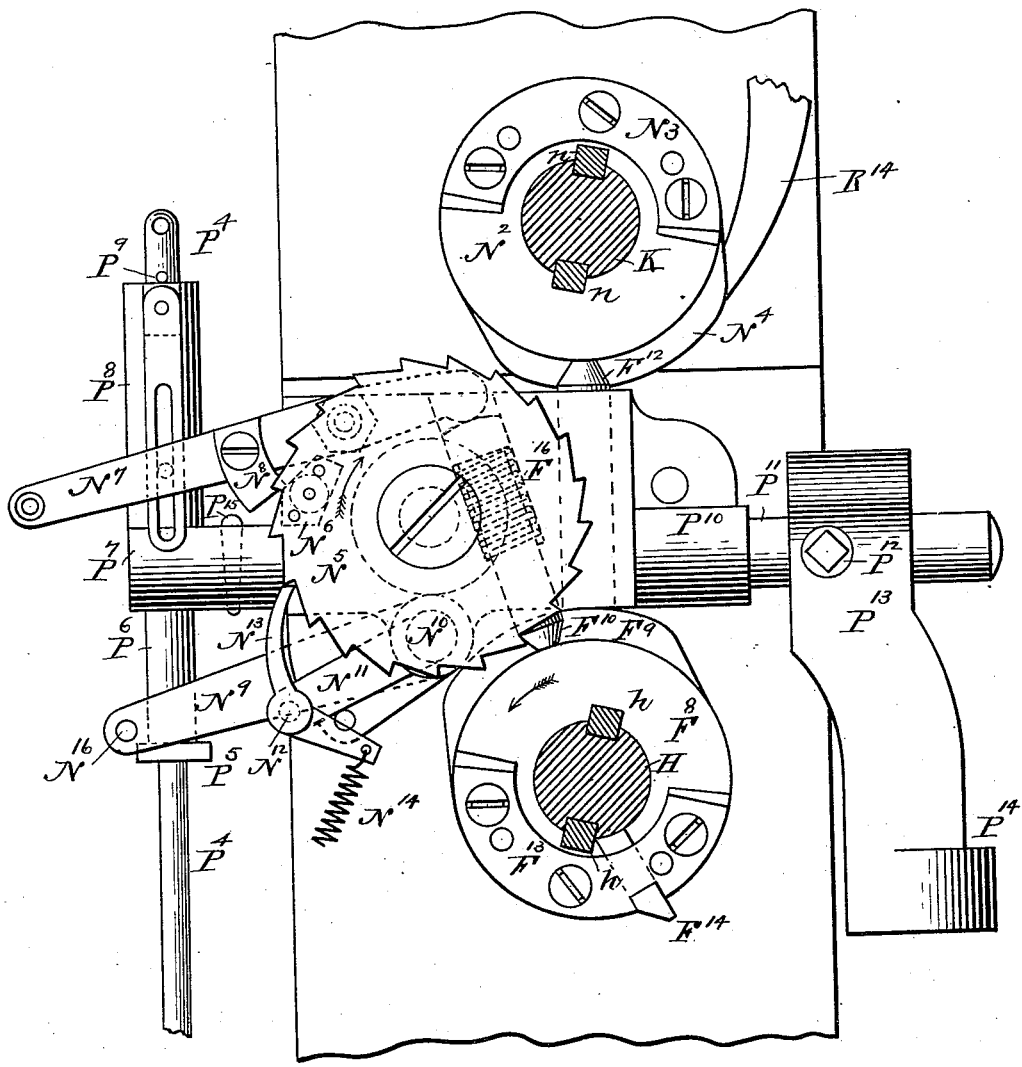
Figure 10:
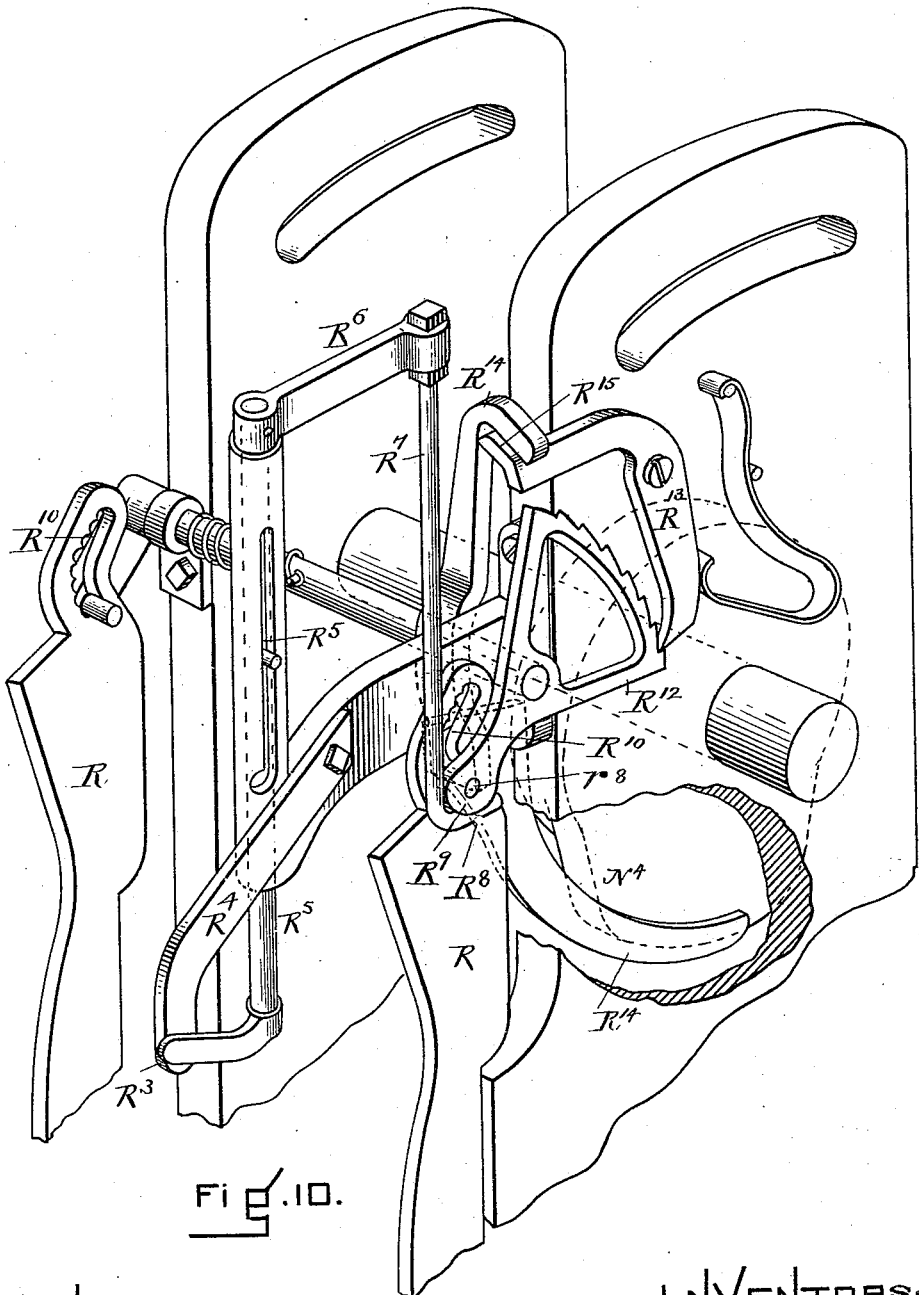

In the drawings, Figure 1 is a side elevation of the machine. Fig. 1ª is a detail showing the tool for treeing the heel. Fig. 2 is a plan of the machine. Fig. 2ª is detail showing part of the drying device. Fig. 2ᵇ is a detail section on line $x\,x$ of Fig. 2. Fig. 3 is a longitudinal vertical section of the machine, some of the parts being shown in elevation. Fig. 4 shows the main working parts of the machine in front elevation, the tree-spreading device being omitted for the purpose of showing the working parts more clearly. Fig. 5 is an elevation of the tree-spreading device, the working machine proper not being shown. Figs. 6, 6ª, and 7 are enlarged views of the toe-working tools and their adjuncts. Figs. 8 and 9 are enlarged views of the parts that relate more directly to the starting and stopping mechanisms. Fig. 10 shows in perspective details of parts connected to the rand-guides.

The shoe-trees are spread and then carried by the turret spread to the rubbing-tools and drying mechanism, and finally back to the starting-point where the shoe is removed. The mechanism for this spreading and holding is shown by Fig. 5.

The tree-spreading device, although in most of its features old, requires a brief description. It consists of a supporting-post B, Figs. 1 and 3, firmly attached to the bed-plate A of the machine. To this post B a disk B' is made fast, the disk serving as a support for the lock $B^2$ and also as a convenience for attaching other parts. Near the top of the supporting-post B a four-armed turret or swiveling head $b$ is mounted. The four arms of the turret are indicated in Fig. 2 by $B^4\ B^5\ B^6\ B^7$ and serve as supports for trees C, upon which the shoes to be treated are to be placed.

$D^5$ is a bent lever, one arm of which passes through the shackles $D^7$ of the trees to spread them and so hold them as required for holding and moving up the shoe to be treed. The lower end of the bent lever $D^5$ is provided with a spring-operated pawl $D^8$, Fig. 1, which is adapted to engage with a curved ratchet $D^9$, and thus hold the lever in place, and though the said lever and shackle hold the shoe it is to be understood that there is one of these devices attached to and moving with each arm of the turret or as many as there are arms, which need not be limited to four, as more may be used if thought desirable. There are two sets of stationary levers for operating the bent shackle-lever $D^5$, one set for the operator who places the shoe onto the tree and one for the operator who takes it off when finished. We will now describe one set of these levers.

D is a foot-lever pivoted at D', Fig. 5, and held up by the spring $d$.

$D^2$ is a link connecting the lever D to the lever $D^3$, the lever $D^3$ being adapted to act upon the under side of the shackle-lever $D^5$ and cause it to act upon the tree, as has been described.

To release the shackle-lever $D^5$, we have a second foot-lever $D^9$, which is mounted upon the lever D, so that it moves in unison therewith with its foot-piece a little above the foot-piece of the lever D during the act of spreading the tree. When the two foot-pieces are brought into line by the foot of the operator, the shackle-lever $D^5$ is free to move backward, as desired. The lever $D^9$ has a link $D^{10}$, which connects it to a let-off lever $D^{11}$, that has a beveled edge $D^{12}$, adapted to move back of the pawl $D^8$, and thus release it and the shackle-lever $D^5$ from the ratchet $D^9$ and unjacking the shoe. The let-off lever $D^{11}$ is held back by the spring $D^{13}$. When the turret with the trees spread is stopped at the proper place, two of the shackle-levers will be located above the let-off levers—that is, in position to be acted upon by them.

The turret-head arms are held in the desired position by the following devices, (see Figs. 2 and $2^b$:) Two locking-bolts $B^{13}$ $B^{13}$ are arranged to slide vertically in the lock $B^2$, being thrown up by springs $B^{14}$ $B^{14}$, their upward motion being limited by fixed pins $B^{15}$ $B^{15}$. The upper ends of the bolts $B^{13}$ $B^{13}$ engage with shoulders $B^{16}$ $B^{16}$, formed on the under side of the arm, (see Fig. $2^b$,) and lock it into the desired position. The bolts $B^{13}$ are operated by a hand-lever $B^{12}$, said hand-lever being connected to the bolts by pivot-pins $B^{17}$ $B^{17}$. By depressing the lever the right-hand bolt is withdrawn, and the turret-head may be turned to the right. By lifting the hand-lever the left-hand bolt is withdrawn and the turret-head may be turned to the left. The fixed pins $B^{15}$ $B^{15}$ act, respectively, as fulcrums for the lever $B^{12}$.

Each of the turret-arms is provided with a tree socket-piece $C'$. This socket-piece receives the tree and is normally free to turn on its horizontal axis, except when the tree is in the position which it occupies while the shoe that it holds is being treed. Then it is held firmly by the following-described device: Each of the turret-arms is provided with a clamping-lever $B^9$, pivoted to the ears $B^{10}$ by the pin $B^{11}$. The inner end of the clamping-lever $B^9$ is forced upward by the action of the upper end of the shackle-lever $D^5$, this action taking place when the shackle-lever holds the shackle in tension and forcing the inner end of the clamping-lever up, causes the outer end to press firmly against the tree socket-piece $C'$, and to hold it and the tree in place.

For convenience in centering or adjusting the tree and the shoe on the turret-arm we have a rod $C^2$, Fig. 5, made with a fork at one end, which embraces the shoe near the toe, and thus acts as a guide for holding it accurately in place until the tree is clamped or otherwise made fast to its turret-arm. The rod $C^2$ passes freely through the swiveling housing $C^3$, attached to the upper end of the post B, the attachment being such that the rod is always held accurately in the vertical plane that passes through the center line of the tree and the shoe; but it is free to swing upward and also to slide longitudinally.

The treeing-tools and their connecting and operating mechanism may be described as follows: The standard F, Figs. 1, 3, and 4, is firmly attached to the bed-plate A, and serves as a support for the working parts. The main driving-wheel $F'$ has a shaft $F^2$, said shaft $F^2$ having a gear-wheel which meshes with the gear-wheel $F^3$ on the shaft $F^4$, and serves to transmit motion through the gear-wheel $F^5$ to the gear-wheel $F^6$. A clutch mechanism transmits motion to the shaft K.

The clutch mechanism above referred to and its connection with the starting and automatic stopping apparatus is peculiar and will be fully described in another part of the specification.

The lower tool apparatus consists of a sliding bracket $H^4$, Fig. 1, and is moved up and down (in properly-constructed ways formed on the standard F) by the crank-arms $H'$ on the shaft H. The cranks $H'$ operate the bracket $H^4$ by means of the links $H^2$, pivoted to the bracket $H^4$ at $H^3$. The spring $H^5$ serves as a counter-balance for the weight of the lower tool apparatus and acts through the links $H^6$, levers $H^7$, and links $H^8$, the links $H^8$ being connected to the levers $H^7$, so that the springs $H^5$ will exert substantially the same balancing-strain upon the sliding bracket $H^4$, regardless of the spring's tension. The tool-holder T is made to slide longitudinally on the bracket $H^4$ by means of a ratchet crank-disk $T^7$. This crank-disk has a crank-pin $T^8$, which works in a vertical groove formed in an adjustable extension $T^6$ of the sliding tool-holder T, and as the ratchet crank-disk rotates the tool-holder T and all of the tools $T'$ $T^2$ $T^3$ $T^4$ are made to move back and forth horizontally. The rotation of the crank-disk $T^7$ is effected by the fixed pawl $T^{10}$ with which the disk comes in contact at the extreme upper part of the vertical movement of the tool apparatus.

The sliding tool-holder T has mounted upon it tool-standards $T'$, one at each side. These standards have at the top a tool proper $t'$, which operates at and near the rand-line of the shoe. These standards are united by swivel-joints at $t^2$ to the part $t^3$, so that the tools $t'$ can swing to and from the rand-line. These tool-standards $T'$ are adjustable vertically in these joints $t^2$, and the joints are provided with springs in pockets formed at the upper ends of the parts $t^3$, which press the standards and of course the tools $t'$ toward the sole of the shoe as far as the joint $t^2$ will allow, so that at certain stages of the rubbing of the shoe the tools will operate next the rand-line, as will be hereinafter described. (See Figs. 1, 3, and 4.) The extension $t^3$, carrying the joints $t^2$, is pivoted to the tool-holder T at $t^{13}$, Fig. 4, so that the tools $t'$ can swing to and from the shoe, and it will be understood that the compression-spring at $t^4$, Fig. 4, will have a tendency to force the lower extension parts $t^3$ $t^3$ outward, and as a consequence force their upper ends, to which the tools $t'$ are attached, inwardly—that is, against the shoe. The pair of tool-standards $T^2$ $T^2$ are arranged substantially and operate to and from the shoe in the same manner as the pair T' T', just described, but have only one joint which connects them to the tool-holder T. These standards $T^2 T^2$ are located so that they can pass under the standards T' T' when they are moved fully back by the rand-guide and when the tool-holder T is moved to its nearest position to the standard F. The pair of tool-standards $T^3 T^3$ are swiveled in substantially the same manner and have the same extension-bars $t^3$ as the pair T' T'.

$T^{12}$, Fig. 3, is a screw-nut firmly secured to the tool-slide T, so that it will reciprocate therewith. A screw-shaft $T^{14}$ is fitted to rotate freely in the nut $T^{12}$, and the inner end of the screw-shaft is reduced in size and fitted to the sliding carriage $T^{13}$, so that when the screw $T^{14}$ is revolved in either direction the carriage will move horizontally upon the tool-slide T. The carriage $T^{13}$ has projecting arms $T^{17}$, in which are mounted (adjustable for height) the studs $T^{18}$, and through the top of these studs are placed the horizontally-adjustable eyebolts $T^{19}$, which engage with and carry one end of the links $T^{11}$, the other ends of the links $T^{11}$ being similarly connected to the sleeves $T^{20}$, which are vertically adjustable upon the tool-standards $T^3 T^3$, the parts $T^{18}$, $T^{19}$, $T^{11}$, and $T^{20}$ forming an adjustably-universal joint, which allows the tools $t'$, carried upon the standards $T^3 T^3$, free motion toward the center of the shoe-tree and at the same time moves them longitudinally thereon by the revolution of the screw $T^{14}$, and also provides means whereby the motion of the tool-faces can be adjusted to any given angle of vamp without changing the pitch of the screw $T^{14}$.

To the outer end of the screw-shaft $T^{14}$ is fixed the gear-wheel $T^{15}$, and the vertical reciprocation of this gear-wheel upon the rack-standard $T^{16}$ gives the desired horizontal reciprocation to the carriage $T^{13}$ for operating the vamp-line tools in addition to the horizontal reciprocation given to the tool-holder T and everything connected therewith for feeding purposes.

The tool-carrying slide T is reciprocated horizontally once for each shoe treed and the rubbing-tools move over the surface operated upon in different vertical lines at each vertical reciprocation thereof. At certain positions of the feeding the tools carried by the standards $T^3 T^3$ pass under those carried by the standards $T^2 T^2$, and both sets pass under those carried by the standards T' T'.

It is not essential that the several rubbing-tools, above referred to, should have the exact connections and swiveling arrangements shown in the drawings, as in actual construction the details may be varied. Therefore we do not think it requisite to describe accurately the details of their construction. The essential features are that the tools shall be so arranged and connected with actuating devices that they shall be free in their several motions to accommodate themselves to the varying surface of the shoe upon which they act.

The tool-holder T carries a special device $T^4$ (see Figs. 1 and 1ª) for working upon the heel part of the vamp, which may be described as follows: $t^5$ is a standard to which one end of a strap $t^{11}$ is attached, the other end of this strap being attached at $t^9$ to the upper end of a hollow cylinder $t^6$. This hollow cylinder $t^6$ is mounted upon a standard $t^7$, upon which it is free to slide and is held up by a spring $t^{10}$. The action of this tool is as follows: As it moves upward the strap $t^{11}$ comes in contact with the heel of the vamp and in its continued upward motion the end of the strap $t^{11}$, which is attached to the standard $t^5$, is forced to go up, and to allow this to take place it is evident that the other end of the strap—that is, the end attached at $t^9$—must be forced relatively downward, this being allowed by the movement of the hollow cylinder $t^6$, and as the end attached to the standard $t^5$ is moving upward in relation to the shoe it is evident that the strap $t^{11}$ must be sliding with a rubbing friction around the convex part of the heel part of the shoe. Thus it does its rubbing work or treeing. This strap may be plain or carry leather, wood, or metal rubbing-tools, according to the kind of leather to be operated upon.

The set of tools T' T', adapted to do the work near the rand, has special guides R R, which, acting against the projections $t^{12}$, Fig. 1, cause the rubbers very nearly to follow the rand-line of the shoe, the springs in the pockets $t^{13}$ holding the projections $t^{12}$ against the formed edges of the rand-guides when the conditions of feeding the tools allow them to do so.

The guide-pieces R, Figs. 1 and 3, are pivoted at R' to a projection $R^2$, and may be adjusted for different-sized shoes by having its upper end swing in or out. The guiding-edge of each guide-piece R is made as near as it is practical to make an edge that shall be approximately correct for all sizes of shoes. By swinging the upper end of the guide-piece in or out the guides will become practically correct for all sizes of shoes. The adjustment of the upper end is effected automatically by the following-described device:

$R^4$ is an arm extending obliquely from the standard F, (see Figs. 1, 4, and 10,) and has pivoted to it an inclined foot-piece $R^3$, which is located in the path that the toe of the shoe traverses when the shoe is on the tree and being swung around by the operator to bring it into position for being treed, and as this foot-piece $R^3$ normally hangs so low that the toe of the smallest shoe will just pass under it without lifting it it may be seen (from the following description) that for the shortest toe the upper end of the guide R will remain in its normal position. When a larger shoe is being put into position, its toe will come in contact with the foot-piece $R^3$ and force it upward. This action will, acting through the standard $R^5$, arm $R^6$, and hooked rod $R^7 R^8$, lift the end $R^9$ of the segment ratchet-lever $R^9 R^{12}$, and as this segment ratchet-lever $R^9 R^{12}$ has a pin at $r^8$, which engages with an inclined slot $R^{10}$ in the upper end of the guide R it will throw the upper end of the said guide R forward—that is, toward the shoe. The amount of forward movement thus given to the guide R will depend upon the size of the shoe. The segment ratchet-lever $R^9 R^{12}$ is held in place by a bent-lever pawl $R^{13}$, which engages with ratchet-teeth formed on the segment end $R^{12}$ of the segment ratchet-lever $R^9 R^{12}$, as shown by dotted lines in Fig. 1, and in full in Fig. 10. The device for releasing the pawl-lever $R^{13}$ consists of a releasing-lever $R^{14}$, Figs. 4 and 10. This releasing-lever $R^{14}$ has an inclined hook at its upper end which engages with an incline $R^{15}$, formed on the end of the bent-lever pawl $R^{13}$, and as the upper end of the releasing-lever $R^{14}$ is thrown to the left by the cam $N^4$, Figs. 8 and 10, which acts upon the lower end of it, (when the machine is stopping,) this movement by a wedge-like action on the incline $R^{15}$ will depress it and throw the pawl end out of engagement with the ratchet on the segment ratchet-lever $R^9 R^{12}$, and a spring around the shaft operating the opposite rand-guide returns the parts to their normal position, ready to start again.

The tools L L and M, Figs. 3, 4, 6, 6$^a$, and 7, tree the toe part of the shoe and are attached to a sliding head $K^6$ by pivots $K^7$, as shown, Fig. 7. Each of the tool-shanks L is firmly attached to a swing-piece $L^4 L^5$, each of said swing-pieces being provided with a motion limited by the screw-bolt $L^6$ and a retractile spring $L^7$. The lower ends of the tool-shanks L are provided with a rubbing-tool $L'$, adjustably held by a pin $L^2$ and a spring $L^3$. The sliding head $K^6$ is attached to a bracket $K^3$, Figs. 1 and 3, which receives its up-and-down movement from the link $K^2$ and crank $K'$, as shown. The sliding head $K^6$ is held to the bracket $K^3$ by means of the screw pivot-bolt $K^4$, Figs. 1 and 6, and the screw-guide flanged piece $k$. This flanged piece is screwed into the bracket $K^3$, the screw pivot-bolt $K^4$ passing through it. This screw pivot-bolt $K^4$ has under its head a reacting spring $K^2$, which, resting upon the head $K^5$ of the screw-guide flanged piece $k$, holds the sliding head $K^6$ with a frictional bearing up to the screw-flanged piece $k$. The tool-head $K^6$ is adjusted vertically by turning the flanged screw-quill piece $K^5 k$, (see Fig. 3) to the right or left. When in the right place, the screw-quill flanged piece is held firmly by the check-nut $k'$.

The tool for treeing the end of the toe of the shoe is shown in Figs. 6 and 7, and consists of a forked piece M, having arms $M^6$, pivoted to the tool-holder head $K^6$, as shown at $M^7$, Fig. 6, and is held adjustably in place by the screw-pin $M^8$ and the spring $M^9$. To one branch of the fork we attach by means of screws $m$ $m$ one end of a strong but yielding strap $M' M^2$, the other end $M^2$ of which passes around a friction-wheel $M^3$, and is connected to a vertical spring $M^4$, the end of the spring $M^4$ being connected to the fork M by a screw $M^5$. The central part of the strap $M' M^2$ is connected by a loop $M^{11}$ to a spring $M^{11}$, which acts as a counter to the spring $M^4$, and thus keeps the strap $M' M^2$ always in place and ready for action. The working of the strap $M' M^2$ on the toe of the shoe is in part the same as the working of the strap $T^4$ (see Fig. 1$^a$) on the heel of the shoe—that is, as the tool moves downward the end $M'$ of the strap is held and the end $M^2$ yields. Thus the strap is drawn with a rubbing action about the toe of the shoe during a portion of the descent of the tool-carrying head, thus fitting the toe to the last. Then the strap passes over the front and finishes a portion of it about equal to the length of the cap of the toe. All of the tools last described attached to the head $K^6$ have, besides the up-and-down motion, an oscillating motion about the vertical screw-bolt $K^4$. This motion is effected by the following-described mechanism, (see Figs. 6 and 6$^a$:) The tool-head $K^6$ is provided with a curved recess $K^{10}$, which receives a loosely-working cylindrical block $K^9$. This cylindrical block $K^9$ is mounted loosely on a crank-pin $K^8$ on the ratchet-disk $K^7$, so that as the disk $K^7$ rotates, the cylindrical block $K^9$ moves up and down in a vertical line in the recess $K^{10}$ and also laterally in a curved path about the bolt $K^4$, and in its lateral motion it imparts a corresponding motion to that part of the tool-holder $K^6$ in which it is located—that is, the rotation of the ratchet-wheel $K^7$ about its axle-pin $K^{11}$ in a vertical plane causes the tool-holder $K^6$ to oscillate in a horizontal plane that gives similar motion to all of the tools carried thereon. A rotating motion is given to the ratchet-wheel $K^7$ by a fixed pawl $K^{12}$, Fig. 1, attached to the standard $F'$, which as the ratchet passes engages with one of its teeth and causes it to make a part rotation.

This machine is adapted to be started by a foot-lever and clutch device, or, if desired, by hand, said foot-lever only acting on the clutch device when a shoe is in position for being treed, and is provided with an automatic stopping device, which stops the machine as soon as it has caused all of the treeing-tools to do the work required of them in treeing one shoe.

The above device may be described as follows: P, Fig. 2, is a foot-lever attached to a rocker-shaft $P'$. Said rocker-shaft, acting through the crank-arm $P^2$, gives motion to the vertical rod $P^3 P^4$, a guide $P^6$, having a collar $P^5$ attached, which acts, under certain conditions to be hereinafter explained, upon the lever $N^9$, and through the said lever rocker-shaft $N^{10}$, arm $N^{11}$, and pawl $N^{13}$, (attached by the pin $N^{12}$ and held in position by the spring $N^{14}$) upon the ratchet-wheel $N^5$. The guide $P^6$ slides up and down in the guide-way $P^7$ $P^8$, its downward motion being limited by the pin $P^9$. The part $P^7 P^8$ is made fast by a key-pin $P^{15}$ to the rod $P^{11}$, which slides in the fixed housing $P^{10}$. This rod $P^{11}$ has attached to its inner end by a set-screw $P^{12}$ an arm $P^{13}$, said arm $P^{13}$ having a heel-piece $P^{14}$. This heel-piece is operated upon by the heel of the shoe, (see Fig. 3)—that is, when the shoe is placed in position for being treed the heel-face will push back the arm $P^{13}$ and acting through it, in combination with the rod $P^{11}$, the piece $P^7 P^8$ will force back the upper end of the rod $P^4$, thus bringing the collar $P^5$, Figs. 3 and 9, under the pin $N^{16}$ on the lever $N^9$, so that if the foot-treadle P (already described) is depressed it, acting on the rod $P^4$ through the pin $N^{16}$, will lift the pawl-lever $N^9$, from which motion is transmitted to the pawl $N^{13}$, as already set forth.

To clearly understand the operation of the starting and stopping device, it must be remembered that the machine in stopping always leaves all of the parts indicated in Figs. 8, 9, and 10 in the precise position therein shown, and that none of the parts are in motion, except the gear-wheels $F^5$ $F^6$. These run loosely on their respective crank-shafts H and K. (See also Figs. 1 and 4.) The shaft H has upon it a clutch and cam drum $F^8$ $F^9$, which is free to slide but not to turn on the said shaft, it being connected by splines $h\ h$, so that if it is made to turn it will cause its shaft to turn also. The drum $F^8$ $F^9$ is held back against the action of springs (indicated by dotted lines at $F^{15}$, Fig. 8) by the holding-pin $F^{10}$, which rubs against the face of the peripherally-projecting cam $F^9$; but when the pin $F^{10}$ is withdrawn the springs $F^{15}$ will force the cams forward on the shaft, so that the face projection $F^{13}$ will engage with the corresponding face projection $F^7$ on the gear-wheel $F^5$, and receiving the motion of the said gear-wheel will transmit it to the crank-shaft H and thence through the intermediate mechanism already described to the lower set of treeing-tools. The cam-clutch device $N^2 N^4$, mounted upon the shaft K, is in all respects like the cam-clutch drum $F^8$ $F^9$, and is mounted on the shaft K by splines $n\ n$, and when thrown forward by the springs $n^5\ n^5$ its face projection $N^3$ will engage with the corresponding projection on the gear-wheel $F^6$ and be set in motion, the said motion being transmitted through the shaft K and mechanism, already described, to the upper set of treeing-tools.

The automatic operation of the parts is as follows: Lifting the pawl $N^{13}$ by the foot-lever P will cause the ratchet-wheel $N^5$ to move in the direction of the arrow. This movement will carry the block $N^6$, upon which the block $N^8$ on the lever rests, out from the said block and thus allow it and the outer end of the lever $N^7$ to drop, the inner end rising, which action will in turn allow the pin $F^{10}$ to be thrown upward by the action of the spring $F^{16}$, thus clearing the face of the cam $F^9$ on the cam-clutch drum $F^8$ $F^9$ and leaving said drum free to be pushed forward by the springs $F^{15}$, so as to engage the clutch projection and be set in motion, as described, and to impart its motion to the crank-shaft H. The motion of the drum $F^8$ $F^9$ in the direction of the arrow carries the peripheral cam projection $F^9$ out from under the pin $F^{12}$ and allows it to be withdrawn by its springs out of the way of the face of the cam $N^4$, thus allowing the cam-drum $N^2$ $N^4$ to be forced forward by the springs $n^5 n^5$, so that it will make a clutch connection with the gear-wheel $F^6$ and, partaking of its motion, cause the crank-shaft K to rotate. The parts will continue to rotate and at each rotation to cause all of the treeing-tools to make a full up-and-down stroke. This rotation will continue until the projection $F^{14}$ on the drum $F^8$ $F^9$ has made as many rotations less one as there are teeth on the ratchet N—that is, at each rotation of the drum the projection $F^{14}$ will engage with one of the teeth on the ratchet, and thus start the ratchet one tooth ahead. This motion of the ratchet will continue until the block $N^6$ comes in contact with the block $N^8$ on the lever $N^7$. Then the lifting of the outer end of the lever $N^7$ will cause the inner end to force the pin $F^{10}$ down, by which the wedge-like action against the face of the cam $F^9$ forces the drum $F^8$ $F^9$ back on the shaft H out of clutch connection with the gear-wheel $F^5$. At about the same time that this happens the cam $F^9$ comes in contact with the lower end of the pin $F^{12}$ and forces it upward, so as to come in contact with the cam $N^4$ on the drum $N^2 N^4$, and thus throw the drum out of clutch connection with the gear-wheel $F^6$, thus terminating the action of all of the treeing-tools. The treeing-tools will now remain out of action and out of the way of the operator until he has placed another shoe in position to be operated upon by the treeing-tools and he depresses the foot-lever P.

Heretofore it has been impracticable to complete the treeing of a boot or shoe by consecutive continuous operations for the reason that a shoe in proper temper for some of the work of treeing is altogether too wet for the finishing operation. Therefore it has been necessary to take the shoe off from the machine when but partly treed and to allow it to dry before the process could be completed. To obviate this objection, we have incorporated with other parts of our machine a device by which powerful drying blasts of air co-operate with the frictional parts of the machine to assist in the treeing operations, and thus render the process of treeing continuous and practically automatic. We will now describe our mechanism by which the result is obtained, reference being had to Figs. 1 and $2^a$.

For a blast-generator an ordinary fan-blower W may be used, from which a pipe $W'$ $W^2$ takes the air to the distributing-pipes $W^3$ $W^4$ $W^5$ $W^6$ $W^7$. These distributing-pipes are arranged, substantially as shown in Fig.

2, so as to deliver to all parts of the shoe powerful blasts of air, and as the several currents of air collide a whirl of air in rapid motion is playing around every part of the shoe, thus drying it so quickly as to complete the process of drying the shoe upon one arm of the turret in the same time that the rubbing process is completed upon a shoe upon another arm of the turret. Thus by the incorporation of the above-described drying apparatus or its equivalent in a treeing-machine we are enabled to make the process of treeing by machinery continuous and practically automatic. This blast mechanism requires several times more power to operate than does the rubbing mechanism.

We claim—

1. In a treeing-machine, the combination of a swiveling turret-head having socket-pieces C′, with a clamping-lever B⁹, and mechanism, substantially as described, for automatically operating the same and locking the foot, substantially as and for the purposes set forth.

2. In a shoe-treeing machine, the combination of an inclined foot-piece R³, adapted to be moved by the toe of the shoe as it is being placed in position to be mechanically treed, with mechanism, substantially as described, for connecting said foot-piece to the swinging rand-guide pieces R, whereby said guide-pieces are automatically adjusted and held, as described, substantially as and for the purposes set forth.

3. In a treeing-machine, the combination of swinging rand-guide pieces R, with the inclined foot-piece R³, attached to the arm R⁴, standard R⁵, its arm R⁶, hooked rod R⁷ R⁸, segment ratchet-arm R⁹ R¹², and holding-lever pawl R¹³, operating substantially as and for the purposes set forth.

4. In a treeing-machine, the combination of the rand-rubbing tools T′ and mechanism, substantially as described, for giving the same vertical and yielding horizontal rubbing motions with an automatically adjustable rand-guide, substantially as and for the purposes set forth.

5. In a treeing-machine, the combination of the heel-treeing tool, consisting of the rigid standards $t^5$ $t^7$, mounted upon the vertically-reciprocating and horizontally-sliding tool-holder T, a sliding rubbing-belt T⁴, provided with rubbing-tools, one end of said belt being fixed to the top of the standard $t^5$ and the other end to the yielding quill $t^6$, which slides on the standard $t^7$ when the tool-holder T is reciprocated, substantially as described, and for the purpose set forth.

6. In combination with a treeing-machine, the toe treeing or finishing strap M′ M², and means, substantially as described, to cause it to first form and finish the end and then the front of the toe of an upper presented upon a tree to its action, substantially as shown and described.

7. In a treeing-machine, the combination of the toe-treeing tool M, tool-head K⁶, on screw pivot-bolt K⁴, on which the tool-head is adapted to swivel, and mechanism for swiveling the same, as described, and for the purpose set forth.

8. In a treeing-machine provided with suitable treeing mechanism, the combination of foot-lever mechanism, substantially as described, connected to the foot-piece P and suitable connecting mechanism to the heel-piece $p^{14}$, whereby the presence of a shoe is required upon the toe before the rubbing-tools before the machine can be set in motion by depressing the foot-piece P, substantially as shown and described.

9. In a treeing-machine, the vamp-line tools T³ T³, and means, substantially as described, for giving them adjustable angular motion, substantially as described, and for the purpose set forth.

10. In a shoe-treeing machine, a turret carrying a series of trees or lasts for holding shoes, mechanism for revolving the trees to bring them consecutively to the rubbing and blast mechanisms, and automatic rubbing mechanism, in combination with mechanism, substantially as described, for delivering a blast of cold air on all sides of the shoe, whereby a shoe may be first treed and dressed, then rubbed, next dried, and then finished and removed from the tree, these steps being performed consecutively, substantially as set forth.

GEORGE W. COPELAND.
JOS. E. CRISP.

Witnesses:
G. P. MORRILL,
W. A. COPELAND.